July 6, 1937.  B. E. DOUGHERTY  2,086,260
ANIMAL TRAP
Filed Oct. 16, 1934  4 Sheets-Sheet 1

Inventor
Bernard E. Dougherty
by
Walter F Kaufman
Attorney

July 6, 1937. B. E. DOUGHERTY 2,086,260
ANIMAL TRAP
Filed Oct. 16, 1934 4 Sheets-Sheet 2

Inventor
Bernard E. Dougherty
by
Walter F. Kaufman
Attorney

July 6, 1937.   B. E. DOUGHERTY   2,086,260
ANIMAL TRAP
Filed Oct. 16, 1934   4 Sheets-Sheet 3

Inventor:
Bernard E. Dougherty
by
Walter + Kaufman

July 6, 1937.   B. E. DOUGHERTY   2,086,260
ANIMAL TRAP
Filed Oct. 16, 1934   4 Sheets—Sheet 4
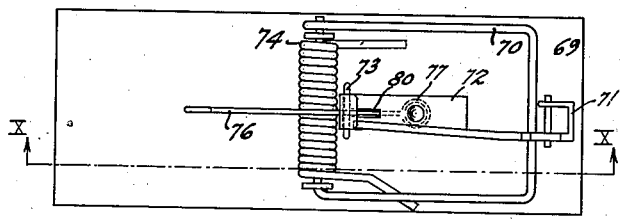
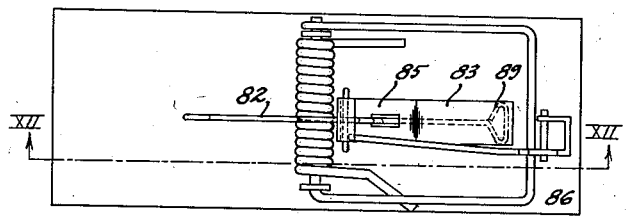
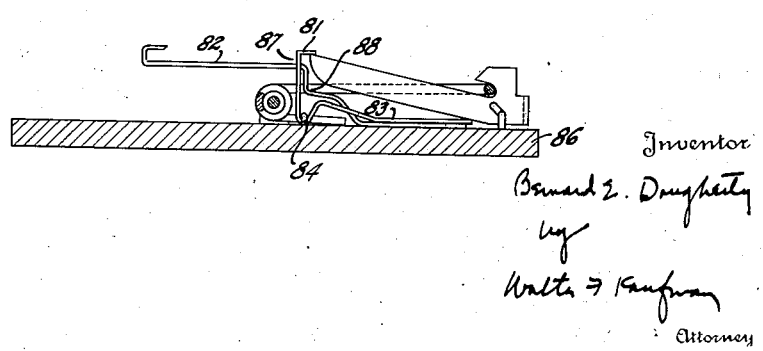
Inventor
Bernard E. Dougherty
by
Walter F. Kaufman
Attorney Patented July 6, 1937

2,086,260

UNITED STATES PATENT OFFICE 2,086,260

ANIMAL TRAP

Bernard E. Dougherty, Seattle, Wash.

Application October 16, 1934, Serial No. 748,467

7 Claims. (Cl. 43—83)

This invention relates to animal traps and more particularly to a trap having a bait treadle operable in a plurality of directions to effect the release of the trap.

Heretofore it has been customary to provide animal traps of the spring operated jaw variety with treadles for the reception of the bait and release of the trap, but a limitation of traps heretofore available has been the fact that the animal sought to be trapped could remove the bait without springing the trap due to the fact that the bait treadle would operate only in a limited way to spring the trap. Numerous devices have been proposed, such for example as providing a treadle normally urging the bait into contact with the base whereby the trap would be sprung when an animal would withdraw the bait from between the treadle and the base. A defect of this type of trap is the fact that an animal may step on the treadle and yet fail to spring the trap. Other traps have been proposed in which the bait treadle will spring the trap when moved either upwardly or downwardly in a vertical path. This is an improvement over those traps which operate by motion of the treadle in one direction only, but unless the trap is very sensitive, the bait may be removed by a side pull without springing the trap.

I provide an improved trap which is releasable by motion in any direction of the portion of the bait treadle holding the bait. This releasing upon universal motion obviates any possibility of the animal sought to be trapped stealing the bait by withdrawing it in a direction not effective for springing the trap, as can be done in prior art structures. It further obviates the possibility of the animal stepping on the trap or brushing past the treadle with impunity. For this reason, I desire the term bait treadle as used herein to be considered as a designation of releasing means rather than a limitation, for it is obvious that it is not essential to the operation of my trap that bait be placed upon the bait treadle. My improved trap is further provided with a sear effective for locking a spring jaw without necessitating manual manipulation of any parts within the "danger zone" of the trap. Other objects and advantages of my invention will become apparent from the following description and the drawings in which:

Figure 9 is a top plan view of another trap embodying my invention;

Figure 11 is a top plan view of a trap embodying my invention;

Figure 12 is a sectional view on the line XII—XII of Figure 11; and

Figure 1:
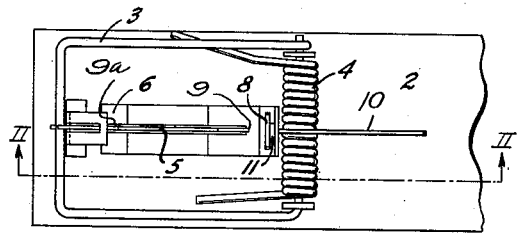
Figure 1 is a top plan view of a trap embodying my invention.
Figure 2:
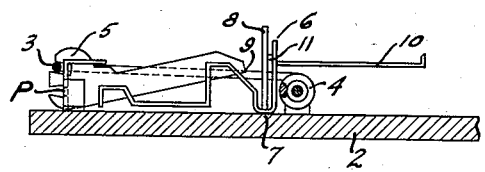
Figure 2 is a sectional view on the line II—II of Figure 1.

Referring to Figures 1 and 2 there is shown a trap comprising a base 2 having a jaw 3 pivoted thereon and actuated by a spring 4. The jaw 3 is illustrated in set position and secured therein by a sear 5 which is engaged with a trigger 6. The trigger 6 is pivoted to rotate in a vertical direction about a point 7 (Figure 2) where it is secured to the base by a support 8 driven into the base 2 and passing through a slotted opening provided in the trigger 6. When the trigger 6 is rotated clockwise about the point 7, the forward end 9 of the sear which engages the end 9a of a slot in the trigger 6 is no longer supported by the trigger and falls through the slot under the thrust of the spring pressed jaw, springing the trap; the sear moving in a clockwise direction. The bait treadle 10 is conveniently in the form of a wire having an enlarged head 11, the head lying between the support 8 and the trigger 6, and the treadle wire being accommodated by a hole through the trigger 6. With the trap in set position as illustrated, the upper thrust of the jaw on the sear 5 causes it to pivot about a point P and thrust downwardly at its forward end 9 against the portion 9a of the trigger 6. The trigger 6 is thereby urged counter-clockwise as viewed in Figure 2 pressing the head 11 against the support 8. It will be apparent that any swinging motion of the bait treadle 10 either laterally, vertically, or as a combination of lateral and vertical motion, will result in the rotation of the head 11, causing the trigger to be moved away from the support 8 where the head 11 is pressed between the support 8 and the trigger 6, and any such motion causing the trigger 6 to move away from the support 8 at this point results in clockwise rotation of the trigger about the pivot point 7 and springing of the trap. It will further be obvious that a direct pull along the axis of the bait treadle will effect the same result and spring the trap. The only force which can be applied to the bait treadle and fail to spring the trap is motion precisely along its axis toward the head 11.

Figure 3:
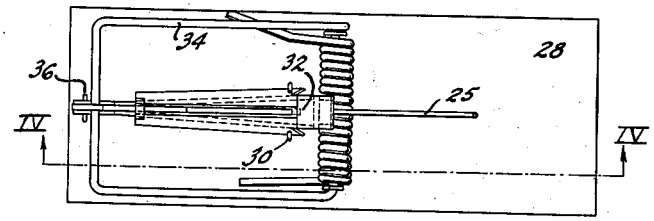
Figure 3 is a top plan view of another form of trap embodying my invention and provided with a different type of sear.
Figure 4:
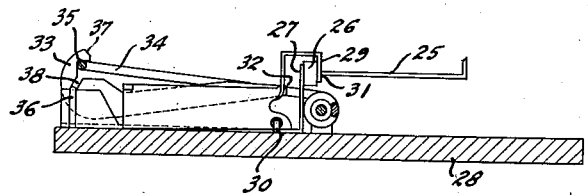
Figure 4 is a sectional view on the line IV—IV of Figure 3.
Figure 13:
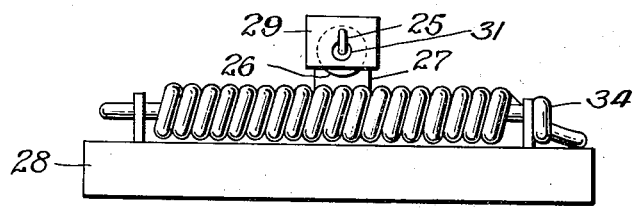
Figure 13 is an end view of the trap shown in Figure 3.

In Figures 3, 4 and 13 there is illustrated another form of trap which is similar to the trap shown in Figure 1 and which, for the sake of brevity, will be described only in those portions where it differs from the trap illustrated in Figure 1.

A bait treadle 25 (Figures 3 and 4) has an enlarged head 26 lying between a support 27 secured to a base 28 and a trigger 29 pivoted to the base 28 by a staple 30. The bait treadle 25 is conveniently in the form of a wire accommodated in a hole at 31 in the trigger 29. Any swinging motion of the bait treadle 25 causing it to pivot at or near the hole 31 causes the head 26 to assume an angular position with respect to the support 27 thereby moving the trigger 29 clockwise about the staple 30. The trigger 29 is effective for holding the end 32 of a sear 33 to prevent the front end 32 from swinging upwardly under the thrust of a spring pressed jaw 34 which engages the sear 33 in a recess 35 which is disposed between a pivot 36 for the sear 33 and the end 32 of the sear 33 to insure that sear 33 will be urged upwardly by the thrust of the spring pressed jaw 34. Above the recess 35 is an inclined portion 37 so that the trap may be set by pushing the jaw downwardly causing the sear 33 to rotate about the pivot 36 in a counter-clockwise direction until the jaw 34 falls into the recess 35. When the spring pressed jaw is then permitted to exert its natural tendency to rotate, the sear 33 is lifted first at the inclined portion 37 until the bottom of a slot 38 engages pivot 36, after which the sear rotates about the pivot 36 until the end 32 engages the lower surface of trigger 29. Thereafter, any motion causing the trigger 29 to rotate clockwise as viewed in Figure 4 will spring the trap and such motion is supplied by the head 26 by any motion of the bait treadle 25 which will cause the head 26 to assume an angular position with respect to the support 27. It is an important advantage of this construction that the sear moves longitudinally of the base, the slot 38 being inclined with respect to the base so that longitudinal motion to the right (Figure 3) will cause the end 32 of the sear 33 to assume a position below and in engagement with the undersurface of trigger 29 when effecting automatic setting. Thus the end 32 of the sear is retracted to the left in order to clear the trigger after the trap has been sprung, (the sear 32 falling by gravity and the slot 38 directing the sear by its engagement with the pivot 36) and is advanced to the right to engage the trigger when the trap is being set.

Figure 5:
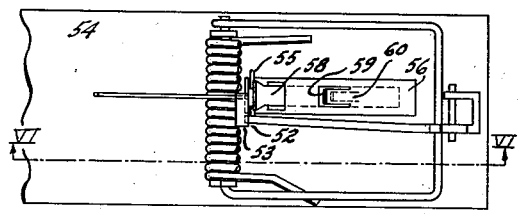
Figure 5 is a top plan view of a trap having a different form of trigger for a universally movable treadle.
Figure 6:
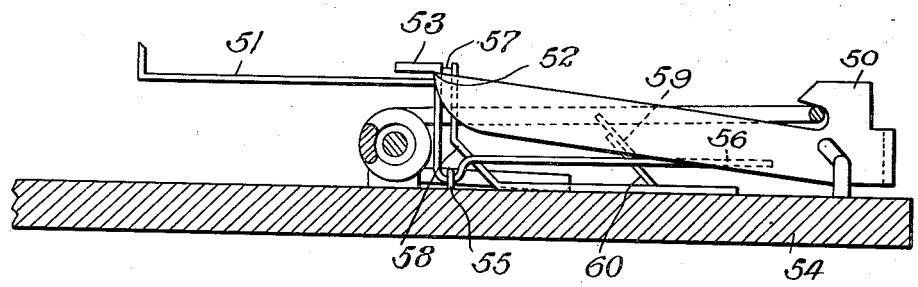
Figure 6 is a sectional view on the line VI—VI of Figure 5.
Figure 10:
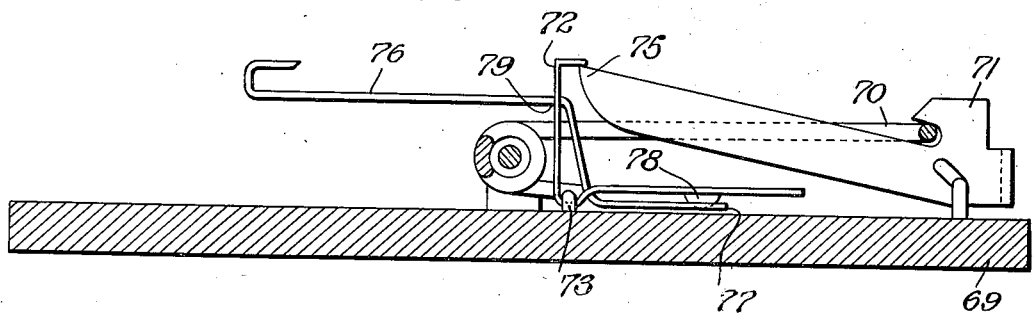
Figure 10 is a sectional view on the line X—X of Figure 9.

In Figures 5 and 6, I have illustrated a trap having a sear 50. A bait treadle 51 is provided like the bait treadle described in connection with Figures 1, 2, 3 and 4. The sear 50 is pressed by the upward thrust of the spring pressed jaw so that its outer end 52 is urged upwardly against a trigger 53. The trigger 53 is pivoted to a base 54 by a staple 55 and normally swung clockwise as shown in Figure 10 by an overhanging portion 56 which under the action of gravity tends to effect such clockwise rotation. A head 57 on the treadle 51 is pressed between a sliding support 58 and the trigger 53 by the action of said overhanging portion 56 in the following manner: The trigger 53 is provided with a tongue 59 struck up from the horizontal portion 56 forming a slot and an inclined surface. The sliding support 58 has a tongue 60 struck up from it which lies within the slot formed by striking up the tongue 59 and engages the tongue 59. Thus downward motion of the horizontal portion 56 and the tongue 59 urges the sliding support 58 to the left as shown in Figure 6 while the trigger is rotating about the pivot 55 whereby the head 57 is pressed between the trigger and the sliding support.

The trap just described is truly universal in its release. Any motion which will swing the head 57 at an angle to the support 58 causes the support and the trigger to move apart and by cooperation of the inclined tongues 59 and 60, causes the trigger to rotate counter-clockwise as viewed in Figure 10, releasing the trap. Likewise any motion longitudinally of the bait treadle 51 pushing the support 58 to the right as shown in Figure 6 will cause the trigger to rotate counter-clockwise and release the trap through the action of the inclined tongues 59 and 60. In addition, any motion longitudinally of the treadle to the left as viewed in Figure 6 will cause the trigger to move in counter-clockwise direction by direct action. In brief, once this trap has been set, there is no motion which can be imparted to the bait treadle without releasing the trap.

Figure 7:
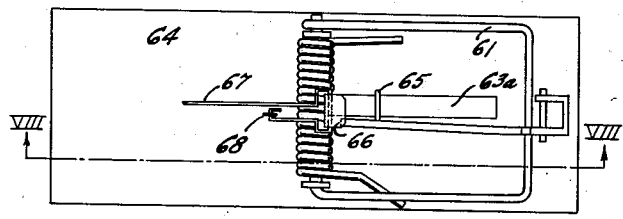
Figure 7 is a top plan view of a trap having yet another form of trigger and treadle.
Figure 8:
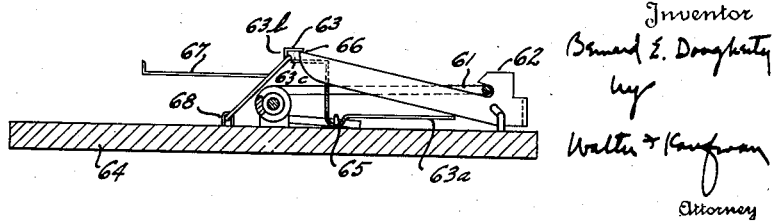
Figure 8 is a sectional view on the line VIII—VIII of Figure 7.

In Figures 7 and 8, I have illustrated a trap having a spring pressed jaw 61 and a sear 62. A trigger 63 pivoted to the base 64 by a staple 65 serves to retain the extreme end 66 of the sear 62 when the trap is set. The trigger 63 is provided with an extended horizontal portion 63a which serves under the force of gravity to normally return the trigger to set position. The end of the trigger opposite the said portion 63a is provided with an angular hook having sides 63b and 63c engageable by a bait treadle 67, the bait treadle having a pivoted connection 68 to the base 64 so disposed that the portion of the bait treadle lying between the pivoted connection 68 and the trigger would, if extended, substantially bisect the angle formed by the sides 63b and 63c constituting the angular hook portion of the trigger referred to. It will be noted in Figure 7 that the pivoted connection 68 preferably lies substantially in a plane bisecting the trigger 63. From the foregoing it will be seen that if the bait treadle is moved upwardly or downwardly, it will rock about the pivoted connection 68 and will rotate the trigger counter-clockwise (Figure 8) by engaging the angular side 63c or 63b respectively. Likewise, if the bait treadle 67 is swung laterally, the trigger will be rotated counter-clockwise inasmuch as the bait treadle 67 will pivot about the pivoted connection 68 and will ride on the angular sides 63b and 63c, it being observed that the bait treadle lying snugly in the corner formed by the said angular sides 63b and 63c permits the trigger to assume its maximum clockwise position when the trap is in set position as illustrated. Any movement of the bait treadle will cause the trap to be sprung inasmuch as any movement will result in the bait treadle moving out of the corner formed by the said angular sides 63b and 63c, and any such motion must be attended by counter-clockwise rotation of the trigger 63. It will thus be seen that the trap illustrated in Figures 7 and 8, like the trap illustrated in Figures 5 and 6, is released by any motion of the bait holding portion of the bait treadle.

In Figures 9, 10, 11 and 12 I have illustrated traps which are similar to the traps illustrated in Figures 1, 2, 3, 4, 5, and 6 in that the area of the base over which the bait treadle extends is free of any projections or moving parts when the trap is in set position. I have found in actual practice that traps of this character are several times as effective, in catching mice, as traps of equal sensitivity but having parts, fastenings or projections on the base adjacent the bait treadle. It appears that the animal sought to be trapped is less wary of a trap which has a clear open space around the bait, and has no parts which can readily be observed to move in the area adjacent the bait treadle prior to the springing of the trap.

In Figures 9 and 10 there is shown a trap having a base 69 with a spring pressed jaw 70 pivoted thereon and a sear 71 secured at one end thereof. A trigger 72 secured by a staple 73 adjacent the spring 74, cooperates with the end 75 of the sear 71 to control the release thereof. The trigger 72 is rotated counter-clockwise about the staple 73 as shown in Figures 9 and 10 by any motion imparted to a bait treadle 76 when the trap is in set position. This is accomplished by providing the bait treadle 76 with a looped end 77 for cooperation with a substantially semi-spherical protuberance 78 struck downwardly from the trigger 72. The bait treadle 76 passes through a slot at 79 in the trigger 72 in a substantially horizontal direction, thence substantially vertically through a slot 80 in the horizontal portion of the trigger, and then horizontally beneath the trigger to the looped end 77. It will be apparent that lateral motion of the bait holding portion of the treadle 76, as viewed in Figure 9, will result in lateral motion in the opposite sense of the looped end 77, the treadle pivoting substantially about its central substantially vertical portion. Lateral motion of the looped end 77 causes the protuberance 78 to rise, rotating the trigger counter-clockwise and springing the trap. The same result is obtained if the bait holding portion of the treadle 76 is moved to the right or left in a sliding motion. If the bait holding portion of the treadle 76 be moved upwardly or downwardly, the same result will obtain. If the motion be downwardly, the treadle rotates the trigger by direct action, no relative motion between the two being necessary. If the said motion be upwardly, the treadle will fulcrum about the looped end 77, lifting freely through the slot at 79, by engaging the trigger at the end of the slot 80 in the horizontal portion, rotating the trigger counter-clockwise. The trap just described is universal in its release and is extremely simple to manufacture. Only round staples are required to secure the parts to the base and no complicated stampings are required. As previously stated, the effectiveness of the trap is further enhanced by the fact that the base adjacent the bait holding portion of the treadle is clear of any projections or unusual features which would alarm an animal sought to be trapped.

In Figures 11 and 12, I have illustrated a trap similar to the trap illustrated in Figures 9 and 10 but provided with a trigger 81 and a treadle 82 of great simplicity. The trigger is pivoted, like the trigger heretofore described, and is provided with a horizontal portion 83 for returning the trigger to set position by gravity, by rotation about a staple 84. The horizontal portion 83, however, is joined to the remainder of the trigger by a portion 85 which extends at an angle to the base 86 of the trap when the trigger is in set position. This portion 85 is provided with a slot through which extends the treadle 82, the portion of the treadle 82 extending through the slot being at an angle of substantially 45° to the base 86. The treadle thus comprises a horizontal portion extending through a slot at 87 in the trigger 81, a vertical portion providing an abutment 88. From the abutment 88 the treadle extends through the slot in the trigger at an angle of about 45° with the base 86 and then extends substantially horizontally along the base to a T-shaped end 89. The action of the trap is somewhat similar to the action of the trap described in connection with Figures 5 and 6 in that motion of the treadle 82 to the right, as viewed in Figure 12, causes the angular portion to cam the horizontal portion of the trigger upwardly, causing the trigger to release the sear. Motion of the treadle to the left as viewed in Figure 12 causes the abutment 88 to rotate the trigger counter-clockwise, releasing the sear. Vertical motion downwardly causes the T-shaped end 89 to rise, the treadle pivoting about the point where the horizontal portion adjacent the base 86 joins the angular portion extending through the slot in the trigger. Vertical motion upwardly gives the same result in that the treadle fulcrums about the T-shaped end 89 and those portions to the left thereof beneath the trigger, causing the trigger to rise. Lateral motion of the bait holding portion of the treadle causes it to pivot about the slot at 87, but inasmuch as the slot in the angular portion 85 of the trigger is in a different plane, the result is that the lateral motion rotates the treadle. This rotation causes the T-shaped end 89 to assume an angular position with respect to the base 86, raising the horizontal portion 83 of the trigger irrespective of the direction of the swinging of the bait holding portion of the treadle laterally. This trap, like the trap illustrated in Figures 9 and 10, is universal in its release and is extremely simple to manufacture.

I thus provide an improved trap in which release is effected by any motion of the bait holding portion of a bait treadle. I also provide a trap in which a spring pressed jaw is retained in set position by a sear movable in one direction for releasing the jaw and releasable in such direction by a linkage which translates any motion of the bait holding portion of a bait treadle into motion effecting release of the sear.

I have also provided an improved trap in which a spring pressed jaw held in set position by a sear releasable by a trigger movable in one direction only to effect such release, is released by any motion of the bait holding portion of a bait treadle in a plurality of directions by virtue of a linkage which translates such motion of the bait holding portion of the treadle into motion which is effective for moving the trigger in a releasing direction.

I also provide an improved spring trap in which setting of the trap may be effected by merely pressing the spring pressed jaw into retaining engagement with a sear, without manual manipulation of the bait treadle.

While I have illustrated and described certain preferred embodiments of my invention, it will be understood that the invention is not so limited but may be otherwise practiced and embodied within the scope of the following claims.

I claim:

1. In a trap, a base, a spring pressed jaw, a sear effective for holding said jaw in set position, a trigger cooperating with said sear, a bait holding treadle cooperating with said trigger, a support cooperating with said bait holding treadle, the treadle having a flattened portion intermediate the support and the trigger, whereby swinging of the treadle in any direction causes relative motion between the trigger and the support and releases the sear.

2. In a trap, a base, a spring pressed jaw pivoted to said base, a sear effective for holding said jaw against the pressure of the spring, a trigger cooperating with said sear to retain the sear in said position, and a bait treadle pivoted to the base and cooperating with said trigger, the association of the parts when set being such that any motion of the bait treadle is effective for causing the trigger to release the sear.

3. In a trap, a base, a spring pressed jaw pivoted thereon, a sear effective for holding said jaw in set position, a trigger controlling said sear, a support, and a bait holding treadle having a portion between said support and said trigger, which portion is wider than it is thick, whereby swinging of the treadle causing rotation of said portion produces relative movement between the trigger and the support.

4. In a trap having a spring pressed jaw and a sear for the control thereof, a trigger engageable with the sear for retaining and releasing the sear, a treadle for releasing the trigger, the treadle having one portion for holding bait, and another portion for engagement with the trigger and being pivoted intermediate said portions, and means changing lateral swinging motion of the treadle into vertical motion of the trigger engaging portion thereof.

5. In a trap, a jaw normally urged in one direction, a sear movable in one direction to release the jaw from set position, a trigger movable in one direction to release the sear, said trigger having a vertical portion and a horizontal portion, and a treadle for controlling the trigger, said treadle being pivoted laterally on the vertical portion of the trigger and having a portion extending between the horizontal portion of the trigger and the base, and cooperated inclined surfaces on the treadle and trigger effective for imparting vertical releasing motion to the trigger upon horizontal movement of the treadle.

6. In a trap, a base, a spring pressed jaw pivoted to the base, a sear pivoted to the base and effective when set for holding said jaw against the pressure of said spring, a pivoted trigger engaging said sear when set, and upon motion in one direction effective for releasing the sear, a bait holding treadle engageable with said trigger at a plurality of points, the arrangement being such that motion of the bait holding treadle in any of a plurality of planes imparts releasing rotation to the trigger by engagement therewith through appropriate points inducing such rotation, the respective points of engagement between said treadle and said trigger being determined by the plane and direction of motion of the treadle.

7. In a trap, a base, a spring pressed jaw, a sear effective when set for holding said jaw against the pressure of said spring, a pivoted trigger effective for holding said sear in set position and movable in one direction to release said sear, a bait holding treadle movable in a plurality of planes with respect to said trigger, said treadle being engageable with said trigger at different points when said trigger is moved in different directions and being engageable with another surface of the trap to impart releasing motion to said trigger.

BERNARD E. DOUGHERTY.